US006984167B2

(12) United States Patent
Asahina

(10) Patent No.: US 6,984,167 B2
(45) Date of Patent: Jan. 10, 2006

(54) POLISHING AGENT AND LAPPING METHOD

(75) Inventor: Masayuki Asahina, Tokyo (JP)

(73) Assignee: Tatsumori Ltd., Tokyo (JP)

( * ) Notice: Subject to any disclaimer, the term of this patent is extended or adjusted under 35 U.S.C. 154(b) by 0 days.

(21) Appl. No.: 10/687,774

(22) Filed: Oct. 20, 2003

(65) Prior Publication Data

US 2004/0082279 A1    Apr. 29, 2004

(30) Foreign Application Priority Data

Oct. 29, 2002   (JP) .............................. 2002-313589

(51) Int. Cl.
*B24B 1/00*        (2006.01)
(52) U.S. Cl. .................. 451/41; 451/36; 451/268; 451/262; 451/287; 51/295
(58) Field of Classification Search .................. 451/41, 451/268, 269, 285, 287, 36, 63, 262; 51/295, 51/298
See application file for complete search history.

(56) References Cited

U.S. PATENT DOCUMENTS 6,196,901 B1 *   3/2001   Minami ..................... 451/63
6,261,476 B1 *   7/2001   Kwok et al. ............... 252/79.1
6,491,837 B1 *  12/2002   Liu et al. ...................... 216/89
6,641,632 B1 *  11/2003   Ronay .......................... 51/309

FOREIGN PATENT DOCUMENTS

JP          A 8-17770            1/1996

OTHER PUBLICATIONS

"Precision Process Technology of Crystalline Material for Electronics", Science Forum Inc., Edited by Masahisa Matsunaga et al., pp. 257-261.

* cited by examiner

*Primary Examiner*—Eileen P. Morgan
(74) *Attorney, Agent, or Firm*—Oliff & Berridge, PLC

(57) ABSTRACT

Disclosed are a polishing agent containing at least globular-silica powder and alumina powder, as well as a lapping method in which a workpiece is held between an upper turn table and a lower turn table and is lapped by rotating the upper and the lower turn tables while being supplied with a polishing agent, wherein the polishing agent supplied is the polishing agent containing at least globular-silica powder and alumina powder. Thus, there can be provided a polishing agent capable of further improving the quality, especially, the flatness of workpieces such as silicon wafers and capable of polishing the workpieces at an excellent polishing rate.

9 Claims, 4 Drawing Sheets

10μm

10μm

POLISHING AGENT AND LAPPING METHOD

BACKGROUND OF THE INVENTION

1. Field of the Invention

The present invention relates to a polishing agent for use in polishing or lapping of workpieces, and more particularly to a polishing agent used preferably when lapping silicon wafers, etc. (note that the polishing agent of the invention is a so-called loose abrasive and that it is not intended to be limited by its name whether it is called "polishing agent" or "lapping agent").

2. Description of the Related Arts

Conventionally, in the manufacture of silicon wafers used as substrates of integrated circuits such as ICs and LSIs, and discrete semiconductor devices such as transistors and diodes, it is general, first, to grow a silicon ingot in Czochralski method (CZ method), floating zone melting method (FZ method) or the like, to slice out wafers from the grown ingot with an inner diameter slicer or a wire saw, and to subject the obtained wafers to a chamfering process for preventing cracking of a peripheral edge portion of the wafers, a lapping process for improving the flatness of the wafers, an etching process for removing mechanical damages and contaminants, and a mirror-polishing process for mirror-polishing the one main surface or both surfaces of each wafer in the order.

In these silicon wafer manufacturing processes, the lapping process described above is a rough polishing process conducted prior to the mirror-polishing process. As a common lapping method, for example, a silicon wafer is held between an upper turn table and a lower turn table of a lapping apparatus and the wafer can be subjected to lapping by rotating the upper and the lower turn tables while being supplied with loose abrasive grains in which a polishing agent is dispersed in a solvent such as water. By performing this lapping process, a mechanically damaged layer created when the wafer is sliced out can be removed as well as the flatness of the wafer can be improved.

As a polishing agent used in the lapping process, alumina-based fine lapping materials are currently used mainly. Among them, as the polishing agent for lapping silicon wafers, FO abrasive grain (manufactured by Fujimi Incorporated) that is a composition of alumina and zircon sand is used and it accounts for almost 100 percent of the total use in Japan. Especially, those having a grain size of, for example, FO abrasive grain #1200 (the maximum diameter; 23.0 $\mu$m or smaller, the average grain diameter: 7.1 $\mu$m) are often used since they well match the surface precision of silicon wafers (see "Precision Process Technology of Crystalline Material for Electronics", Science Forum Inc., Edited by Masahisa Matsunaga et al., pp. 257–261)).

In the case for a polishing agent of such composition of alumina and zircon sand, a workpiece is ground basically by the action of alumina contained in the polishing agent, and occurrence of scratches caused by the polishing can be suppressed as well as the surface of the workpiece can be flattened by the action of zircon sand. Therefore, by utilizing these actions of alumina and zircon, the workpiece can be subjected to the lapping.

However, with the recent finer processes and higher integration degree of semiconductor devices, efforts have been made for improving the performance of polishing agents by advancing still currently improvement and development of polishing agents such that higher-quality wafers with higher flatness can be obtained efficiently (see, e.g., Japanese Patent Application Laid-open (Kokai) No. 8-17770).

In general, silicon wafers having been lapped (hereinafter, referred to simply as "lapped wafers") are often evaluated by qualities such as their flatness, surface roughness, scratches, etc. Therefore, such a polishing agent is demanded as the one which can further improve these wafer qualities as well as the one which is excellent in polishing efficiency in terms of improvement of productivity, i.e., the one which has as high polishing rate of wafers as possible.

However, in the case of a polishing agent as described above comprising a composition of alumina and zircon sand, the polishing ability that alumina originally has is lost because zircon sand is contained in the agent. Therefore, the agent has a disadvantage that it has a lower polishing rate compared to a polishing agent comprising only alumina. On the other hand, when the amount of alumina contained is increased to utilize the polishing ability of alumina, the flattening ability for flattening a workpiece, that the polishing agent has is weakened because the amount of zircon sand contained is decreased, and scratches are liable to be generated on the workpiece. For this reason, there is a problem that the quality of a workpiece after lapping cannot be improved any more.

SUMMARY OF THE INVENTION

The present invention was conceived in view of the above problems. It is therefore the object of the invention to provide a polishing agent capable of further improving the quality, especially, the flatness of workpieces (targets to be polished) such as silicon wafers and capable of polishing the workpieces at an excellent polishing rate.

In order to achieve the above object, according to the invention there is provided a polishing agent containing at least globular-silica powder and alumina powder.

In the case of a polishing agent containing at least globular-silica powder and alumina powder as described above, when, for example, lapping is carried out using this polishing agent, workpieces can be polished at a more excellent polishing rate than that with a conventional polishing agent as well as occurrence of scratches caused during the lapping can be suppressed and the flatness of the workpieces can be further improved compared to a conventional agent. Furthermore, since the polishing agent of the present invention contains globular-silica powder as described above, it can be a high-performance polishing agent having a polishing function capable of improving the surface roughness of workpieces as well as flatting the workpieces.

In the polishing agent of the invention, it is preferable that the average grain diameter of the globular-silica powder is smaller than the average grain diameter of the alumina powder.

If the globular-silica powder has a smaller average grain diameter than the alumina powder, the polishing ability of the alumina powder contained in the polishing agent is not lowered. Therefore, workpieces can be polished at an excellent polishing rate and the flatness of the workpieces can be sufficiently improved.

In the above cases, it is preferable that the average grain diameter of the globular-silica powder is 2–7 $\mu$m.

When the average grain diameter of the globular-silica powder is 2–7 $\mu$m as described above, the polishing agent of the invention can be a very effective polishing agent for subjecting especially silicon wafers and quartz wafers to the lapping.

Furthermore, it is preferable that the amount of the globular-silica contained in the polishing agent is 20–50 percent by weight.

When the amount of the globular-silica contained in the polishing agent is 20–50 percent by weight, the polishing agent of the invention can improve the flatness of workpieces, securing the excellent polishing rate.

According to the invention, there is provided a lapping method in which a workpiece is lapped using the above polishing agent of the invention.

In this manner, when a workpiece is lapped using the polishing agent of the invention, compared to a conventional lapping, the workpiece can be polished at a more excellent polishing rate and the flatness of the workpiece can be further improved.

Furthermore, according to the invention, there is provided a lapping method in which a workpiece is held between an upper turn table and a lower turn table and is lapped by rotating the upper and the lower turn tables while being supplied with a polishing agent, wherein the polishing agent is a polishing agent containing at least globular-silica powder and alumina powder.

By lapping with an agent containing at least globular-silica powder and alumina powder as a polishing agent when a workpiece is lapped as described above, the workpiece can be polished at an excellent polishing rate and the flatness of the workpiece can be further improved compared to a conventional lapping, while suppressing the occurrence of scratches caused during the lapping. Therefore, high-quality workpieces can be efficiently obtained. Furthermore, by the lapping method as described above, the surface roughness of workpieces can also be considerably improved compared to a conventional lapping method. Therefore, when subjecting the workpiece after lapping to, for example, a mirror-polish process, it is possible to reduce the stock removal for mirror-polishing of a workpiece. Thereby, it is expected that the polishing time in the mirror-polishing process is reduced and the lifetime of a polishing pad is extended and, furthermore, that degradation of the flatness of workpieces is prevented. Then, as a result, it is possible to lead to improvement of the productivity, reduction of the costs and improvement of the quality of workpieces.

In the lapping method of the present invention, the workpieces to be lapped can be silicon wafers or quartz wafers.

The lapping method of the invention can be used effectively for lapping of silicon wafers or quartz wafers which require further quality improvement such as improvement of flatness from now on. When workpieces to be lapped in the above lapping method are silicon wafers or quartz wafers, the workpieces can be polished at an excellent polishing rate and their flatness can be improved while preventing the occurrence of scratches.

As described above, according to the invention, a high-performance polishing agent can be provided, that can polish workpieces at more excellent polishing rate compared to the polishing with a conventional polishing agent and that can further improve the flatness of the workpieces while suppressing the occurrence of scratches caused during the lapping, and furthermore, that has also a polishing function capable of improving the surface roughness of the workpieces.

DESCRIPTION OF THE PREFERRED EMBODIMENTS

Embodiments of the present invention will be described hereinbelow in a non-limitative manner for the illustrative purposes only.

Conventionally, as a polishing agent used for lapping workpieces such as silicon wafers, an agent comprising a composition of alumina and zircon sand has been mainly used. However, in the case for this conventional polishing agent, when, for example, improvement of the flatness that is especially important in the quality of lapped wafers is attempted, the polishing rate is lowered, and accordingly, the polishing efficiency is lowered. On the other hand, when improvement of the polishing efficiency is attempted, the quality of wafers consequently is degraded. Therefore, it has been considered difficult to improve simultaneously both of wafer quality (especially flatness) and the polishing rate.

Then, inventors have studied and investigated earnestly in order to obtain a polishing agent that can improve the flatness of workpieces suppressing the occurrence of scratches on the workpieces compared to the conventional polishing agents used in lapping workpieces as described above, and that has an excellent polishing rate. As a result, the inventors have found that if there is a polishing agent containing at least globular-silica powder and alumina powder as a polishing agent capable of utilizing sufficiently the polishing ability of alumina and simultaneously having a sufficient flattening ability, it is extremely effective as a polishing agent used for lapping of workpieces and the like. Then the inventors completed the invention.

The polishing agent of the invention will be described in detail with reference to the accompanying drawings.

A method for manufacturing the polishing agent of the present invention will be described. However, the invention is to provide a polishing agent containing at least globular-silica powder and alumina powder and its manufacturing method is not limited at all.

First, globular-silica powder and alumina powder used in the polishing agent are respectively manufactured.

Figure 1:
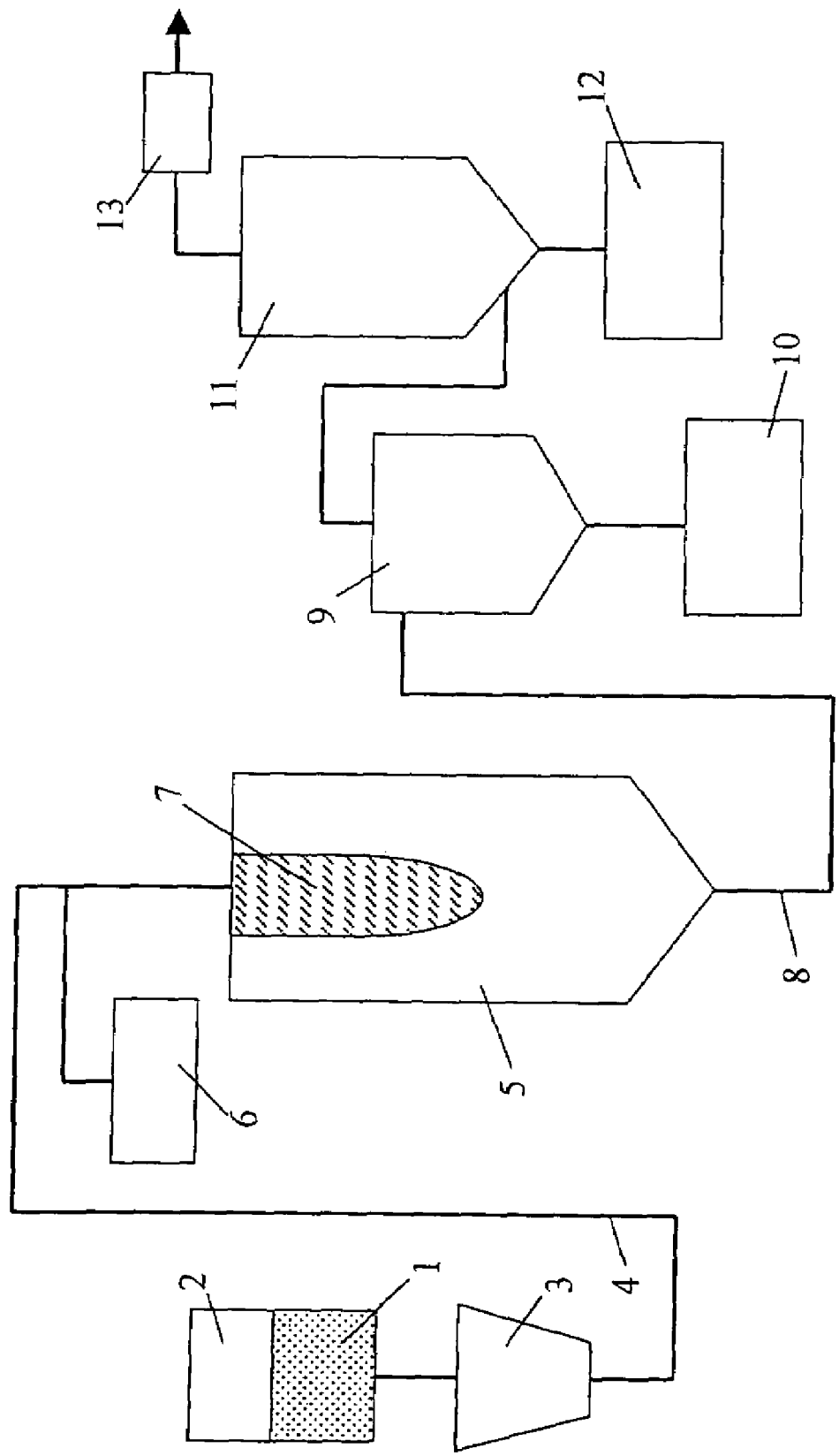
FIG. 1 is a schematic view of a manufacturing apparatus for manufacturing globular-silica powder.

The globular-silica powder used in the polishing agent of the invention can be manufactured according to the commonly conducted manufacturing method and it can be manufactured using, for example, a manufacturing apparatus as shown in FIG. 1. The manufacturing method of globular-silica powder will be described referring to FIG. 1.

First, the raw material silica powder 1 filled in a raw material tank 2 is fed by a quantitative feeder 3 and supplied to a melting furnace 5 through a supply pipe 4 with oxygen to be the carrier gas. In this melting furnace 5, flames 7 are formed by the oxygen and a flammable gas fed from a cylinder 6. By introducing to the flames 7 the raw material silica powder 1 supplied from the supply pipe 4, the silica powder melts in the flames and is made into globules under the action of the surface tension. In this case, as the flammable gas to be supplied, propane, butane, acetylene and the like can be used. The temperature of the flames to which the raw material silica powder is introduced is preferably approximately 2,000° C.

Thereafter, the globular-silica powder in the form of globules is introduced through a discharge pipe 8 to a cyclone 9 and further to a bag filter 11, and collected into product tanks 10 and 12 respectively after separation from exhaust gas and classification of powder. The exhaust gas separated from the globular-silica powder is discharged to the outside by a blower 13. The globular-silica powder collected in the product tanks 10 or 12 as described above is, thereafter, further classified precisely by elutriation and the like and globular-silica powder having a desired grain size distribution can be obtained.

Figure 2:
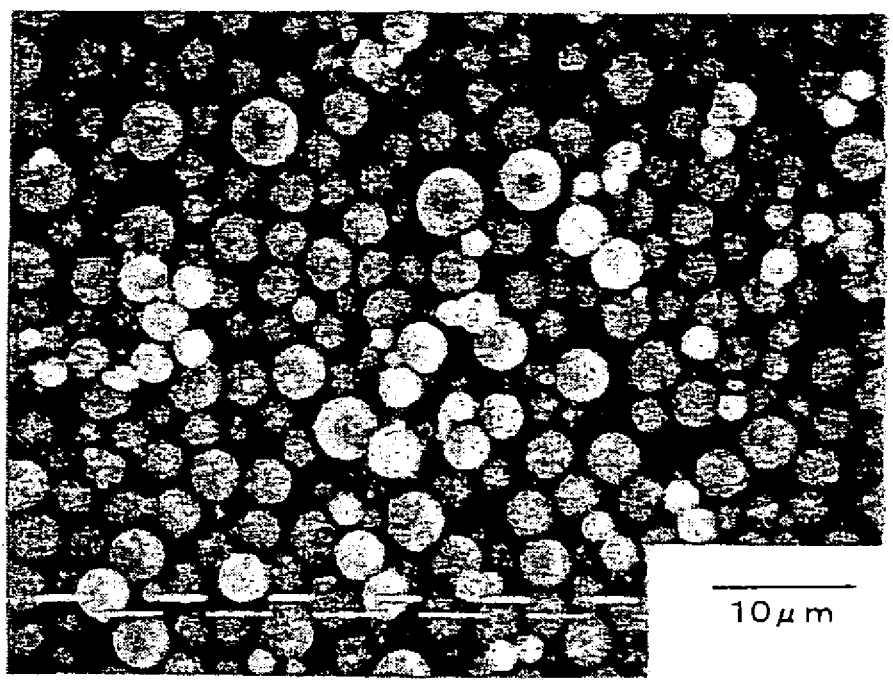
FIG. 2 shows the result of observation of the globular-silica powder effected by an electron microscope.

Observing the globular-silica powder obtained as described above with an electron microscope, as shown in FIG. 2, the grain diameter is controlled to be approximately uniform and most of the grains are perfect-spherical silica powder globules each having a perfect circular shape. It is enough that the globular-silica powder contained in the polishing agent of the present invention is globular, however, it is more preferable that the shape of each grain of the silica powder is perfect-spherical as described above since the flattening ability of the polishing agent can be further improved.

On the other hand, the alumina powder used in the polishing agent of the present invention can be also manufactured by a conventionally conducted method.

Figure 3:
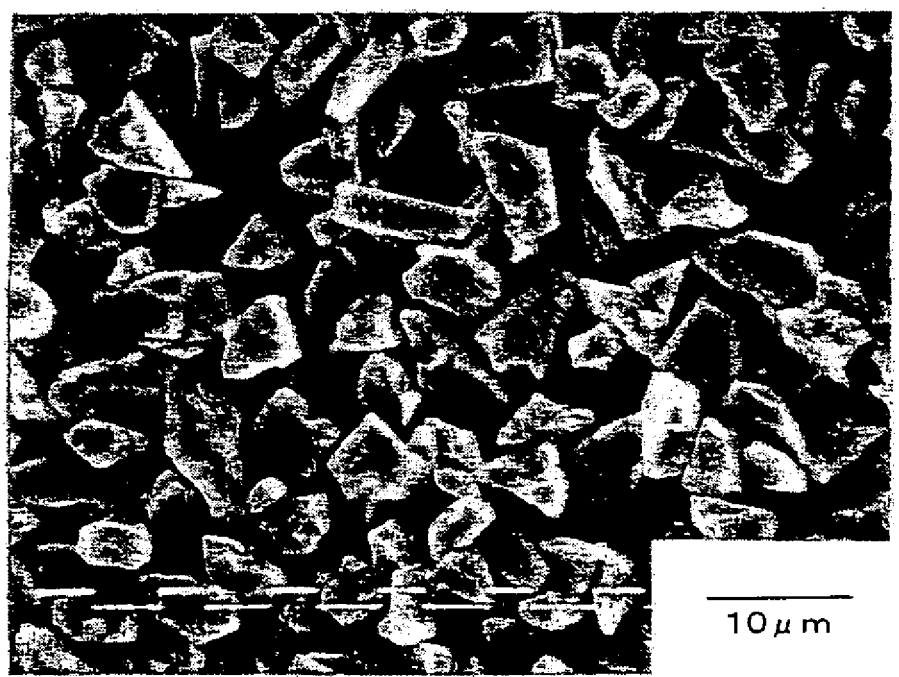
FIG. 3 shows the result of observation of the alumina powder effected by the electron microscope.

For example, first, bauxite containing alumina as its main component is melt and reduced by an electric melting furnace to increase the concentration of the alumina component, and then solidified to produce an ingot. Next, the obtained alumina ingot is crushed into small grains and the small grains are further crushed into fine powder by ball mill and the like. By classifying the fine powder of alumina obtained in this manner more precisely by air classification or wet classification, alumina powder having a desired grain size distribution can be obtained. Observing actually the alumina powder obtained in this manner with an electron microscope, as shown in FIG. 3, the grain diameter is controlled to be almost uniform and each grain has an angular shape.

After manufacturing respectively the globular-silica powder and the alumina powder having respectively a desired grain size distribution as described above, the polishing agent of the present invention can be obtained by mixing those powders using a disperser etc. In this case, the method in which the globular-silica powder and the alumina powder are mixed is not limited especially to a particular method and, for example, they may be mixed by dry blending or wet blending.

By the manufacturing method as described above, the polishing agent of the present invention, containing at least globular-silica powder and alumina powder can be manufactured.

As for the above described polishing agent of the present invention, it is preferable that the average grain diameter of the globular-silica powder in the polishing agent is smaller than the average grain diameter of the alumina powder. The average grain diameters of the globular-silica powder and the alumina powder can be easily controlled by carrying out the classification precisely when each of the powders is manufactured as described above. As described above, since the globular-silica powder has a smaller average grain diameter than the alumina powder, a workpiece can be polished at an excellent polishing rate without losing the polishing ability of the alumina powder when the workpiece is lapped. Furthermore, due to the action of the globular-silica powder, the occurrence of scratches caused on the workpiece can be suppressed, and the flatness of the workpiece can be sufficiently improved.

When silicon wafers and quartz wafers are lapped, they are usually lapped with a polishing agent containing alumina powder as its main component having the average grain diameter of approximately 7–10 $\mu$m. Therefore, when especially silicon wafers, quartz wafers and the like are lapped, it is preferable that the average grain diameter of the globular-silica powder is controlled to be 2–7 $\mu$m that is smaller than the average grain diameter of the alumina powder. If the polishing agent containing globular-silica powder has such an average grain diameter, it can be a polishing agent very effective for lapping of silicon wafers, quartz wafers and the like.

Furthermore, as for the polishing agent of the present invention, in the case where the amount of the globular-silica powder contained in the polishing agent is less than 20 percent by weight, the polishing rate for a workpiece can fully obtained, however, the flatness of the workpiece may not be improved sufficiently. On the other hand, in the case where the amount of the globular-silica powder contained exceeds 50 percent by weight, it is considered that the polishing ability of the alumina is suppressed resulting in decrease of the polishing rate. Therefore, it is preferable that the amount of the globular silica contained in the polishing agent is 20–50 percent by weight and more preferably approximately 30 percent by weight. Thereby, a polishing agent capable of improving the flatness surely at an excellent polishing rate can be obtained.

Figure 4:
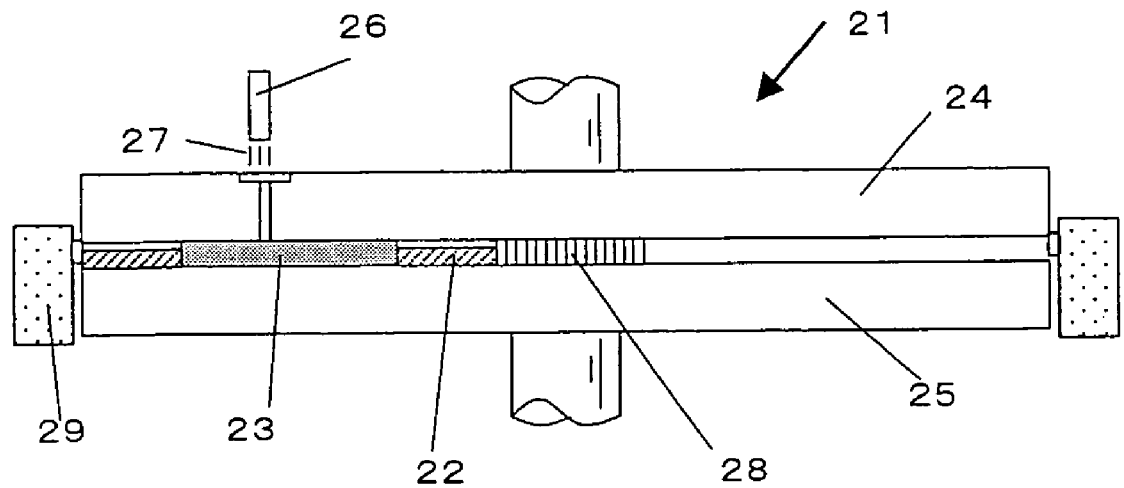
FIG. 4 is a schematic view of a lapping apparatus used in the invention.

Next, a lapping method for lapping a workpiece with the polishing agent of the present invention will be described referring to the drawings. FIG. 4 shows an example of a lapping apparatus used in the lapping method of the invention, however, the invention is not limited to the case where this apparatus is used.

First, a carrier 22 is engaged with a sun gear 28 and an internal gear 29 in a lapping apparatus 21, and a workpiece 23 is set in a holder of the carrier 22. After that, both surfaces of the workpiece 23 are held so as to put the workpiece 23 between an upper turn table 24 and a lower turn table 25, and then, the carrier 22 performs Sun-and-planet motion by the sun gear 28 and the internal gear 29 while supplying a polishing agent 27 of loose abrasive grains from a nozzle 26, and simultaneously the upper turn table 24 and the lower turn table 25 are rotated in relative directions each other, and thereby both surfaces of the workpiece 23 can be subjected to lapping simultaneously.

In this case, the polishing agent 27 supplied from the nozzle 26 is the polishing agent of the present invention, containing at least globular-silica powder and alumina powder, and the polishing agent in which the components are dispersed in pure water or weak alkaline solvent is used. In this case, the polishing agent can be stably dispersed in the solvent by further adding a dispersant to the polishing agent 27, and therefore, occurrence of scratches caused on workpieces during the lapping can be further suppressed. Various additives such as a surface-active agent may be added when necessary.

As described above, by lapping a workpiece using the polishing agent containing at least globular-silica powder and alumina powder as a polishing agent, the workpiece can be polished at an excellent polishing rate without suppressing the polishing ability of the alumina powder. Therefore, the polishing ability can be improved as well as the workpiece can be processed so that it may have a higher flatness than a conventional lapping, while suppressing the occurrence of scratches caused on the workpiece during the lapping.

Furthermore, since the surface roughness of a workpiece can be remarkably improved compared to a conventional polishing agent by lapping the workpiece with the polishing agent of the present invention, after the lapping, it is possible, for example, to reduce the stock removal for polishing when subjecting the lapped workpiece to a mirror-polishing process. Therefore, degradation of the flatness in the mirror-polishing process can be prevented as much as possible and it is expected to reduce the polishing time and to extend the lifetime of the polishing pad. Consequently, improvement of the quality and the productivity, and cost reduction can be attained.

Furthermore, the polishing agent of the present invention can be used especially effectively when silicon wafers or quartz wafers are lapped. By lapping silicon wafers or quartz wafers by the above lapping method, they can be polished at an excellent polishing rate as well as the flatness of the wafers can be surely improved.

The action of the polishing agent of the present invention as described above is not clarified at present. However, it is considered that the polishing rate can be increased compared to that of a conventional polishing agent since the silica powder also has a polishing action, and that a workpiece can be made flat without damaging it and without degrading the surface roughness thereof even though the polishing rate is same or higher compared to a conventional lapping process, since the silica powder is globular.

The polishing agent of the present invention is not only used preferably as a polishing agent for lapping but also used preferably as, for example, slurry (using the polishing agent having a grain size distribution centering on a rather large grain diameter) provided during slicing out wafers from a silicon ingot using a wire saw and as a polishing agent (using the polishing agent having a grain size distribution centering on a rather small grain diameter) for CMP (Chemical Mechanical Polishing) in the mirror-polishing process by controlling appropriately the grain diameters (grain size distribution) of the globular-silica powder and alumina powder. For example, by using the polishing agent of the present invention as slurry used during slicing out wafers from a silicon ingot by a wire saw, a conventional problems such as clogging can be surely prevented and it is possible to further improve the quality of the sliced wafers.

EXAMPLE

The invention will be described in detail presenting examples and comparative examples, however, the invention is not limited to these examples.

Examples 1–3 and Comparative Examples 1 and 2

First, globular-silica powder and alumina powder were manufactured. As to the globular-silica powder, by using the manufacturing apparatus shown in FIG. 1, raw material silica powder was melted at approximately 2,000° C. in flames formed by propane gas and oxygen to make the grains of the powder into globular shape, and then, they are collected by the bag filter. Thereafter, they were classified precisely by elutriation to obtain the globular-silica powder.

As to the alumina powder, melted alumina was produced by melting bauxite, then, the melted alumina was crushed into alumina fine powder. Thereafter, this alumina fine powder was classified by elutriation to obtain the alumina powder. As for the grain size distribution of the obtained globular-silica powder and the alumina powder, the average grain diameters of them were measured using Coalter Multisizer II (manufactured by Beckman Coalter Inc.). As a result, the average grain diameter of the globular-silica powder was 4.22 $\mu$m and the average grain diameter of the alumina powder was 6.62 $\mu$m.

Figure 5:
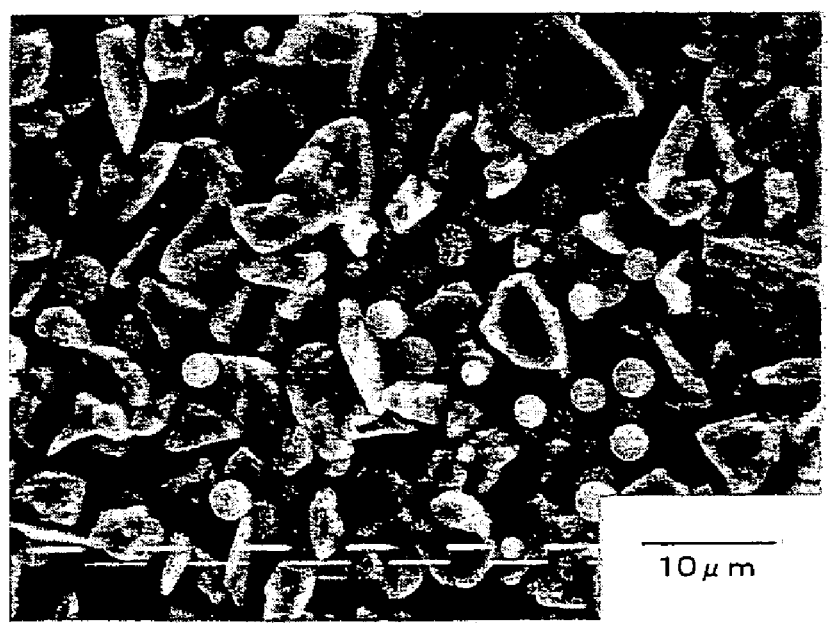
FIG. 5 shows the result of observation of the polishing agent of Example 1 effected by the electron microscope.
Figure 6:
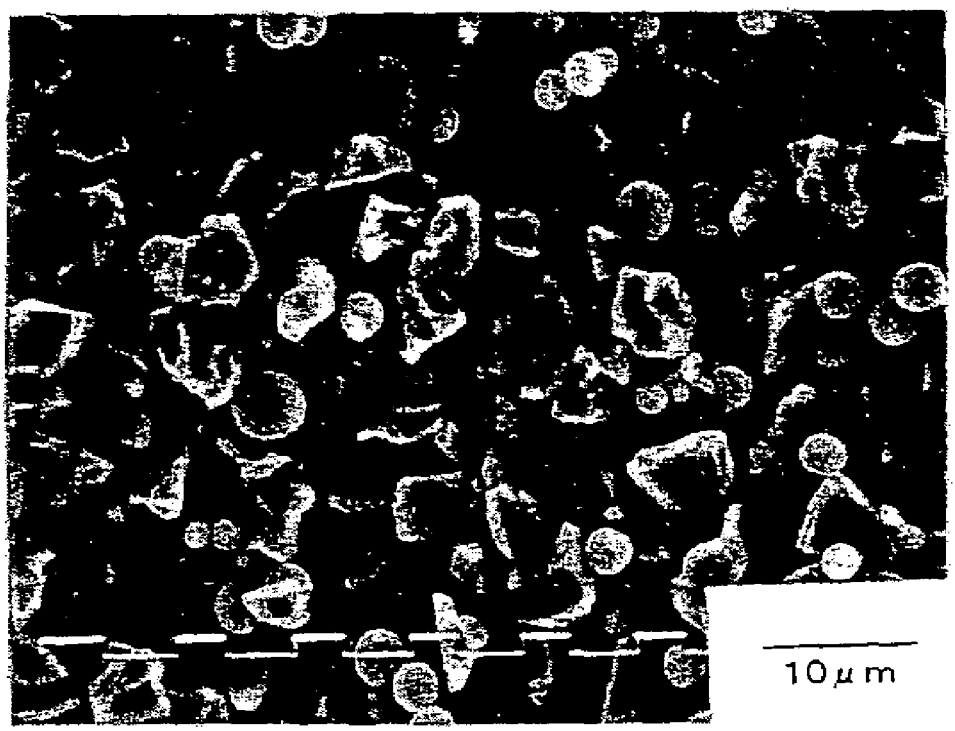
FIG. 6 shows the result of observation of the polishing agent of Example 2 effected by the electron microscope.
Figure 7:
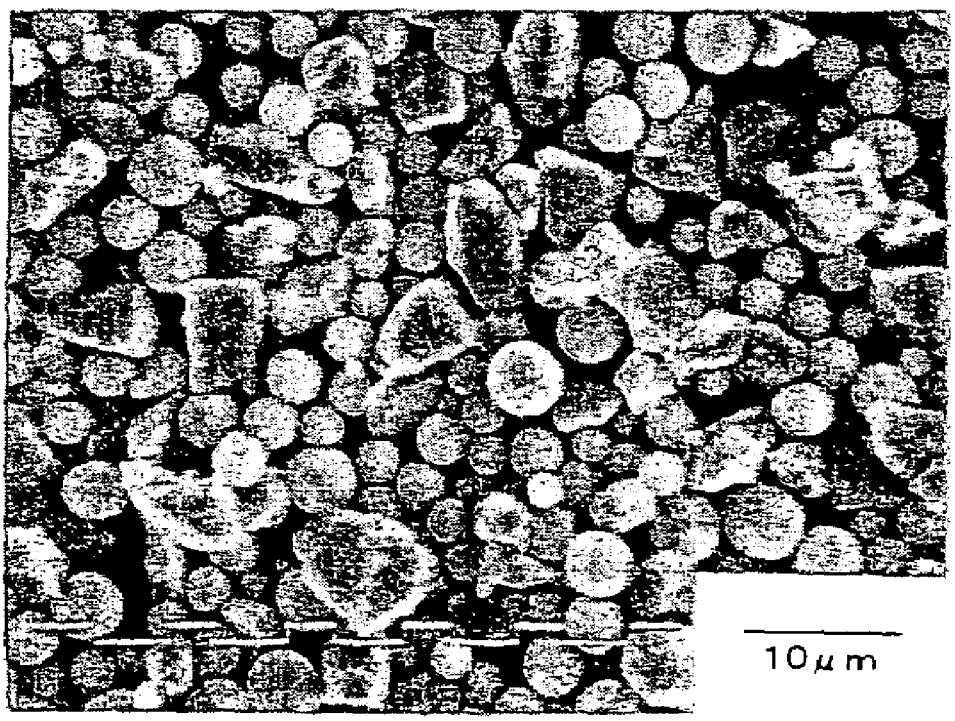
FIG. 7 shows the result of observation of the polishing agent of Example 3 effected by the electron microscope.

Next, a polishing agent was manufactured by mixing the globular-silica powder and the alumina powder obtained as described above, using a disperser. In this case, three types of polishing agents were prepared such that they have the ratios of the mixed globular-silica powder and alumina powder (the globular-silica powder: alumina powder) of 22:78, 28:72 and 40:60 (Examples 1–3). The polishing agents prepared in this manner were observed with an electron microscope. FIG. 5–7 respectively show the result of the observation of the polishing agents of Example 1–3.

For the purpose of comparison, a polishing agent (Comparative Example 1) of 100% alumina powder without containing globular-silica powder was manufactured, and another polishing agent (Comparative Example 2) consisting of alumina and zircon sand which is used in general conventionally, was further prepared separately.

After preparing those polishing agents in this way, the polishing agents were respectively dispersed in pure water. Next, using the lapping apparatus shown in FIG. 4, a silicon wafer having a diameter of 200 mm manufactured by CZ method was lapped while being supplied with the polishing agent made of loose abrasive grains from a nozzle at 1.5 1/min. In this case, the stock removal for lapping was approximately 70 $\mu$m on both surfaces of the wafer.

After the lapping, the polishing rates for each polishing agent were calculated from each stock removal for lapping and each process time required for finishing the lapping. As to the silicon wafers having been lapped (lapped silicon wafers), occurrence of scratches was checked for the front and back surfaces of each wafer by visual inspection under a collimated light. The flatness and the surface roughness of each wafer were measured by the following methods.

The flatness of a lapped wafer was evaluated in terms of TV13 by performing a 13-points measurement in a wafer surface in which thickness of a lapped wafer is measured at the center point and 12 points 6 mm inner from the periphery of the wafer, and calculating (the maximum)–(the minimum) thereof.

As to the surface roughness of the lapped wafer, a 3D measurement was carried out for total of nine (9) points by measuring at three (3) points respectively in portions of 5 mm and 20 mm from the orientation flat of the wafer and the central portion of the wafer using a three dimensional electron probe surface roughness analyzer ERA-8800 (manufactured by ELIONIX Inc.), and the average of the measurements was calculated.

The following Table 1 shows the result of the measurement of polishing rate for each polishing agent, and occurrence of scratches, flatness and surface roughness of lapped wafers lapped respectively with each polishing agent.

TABLE 1

| Sample | | Example 1 | Example 2 | Example 3 | Comparative Example 1 | Comparative Example 2 |
|---|---|---|---|---|---|---|
| Composition | Globular Silica Powder | 22 wt % | 28 wt % | 40 wt % | 0 wt % | Alumina + Zircon |
| | Alumina Powder | 78 wt % | 72 wt % | 60 wt % | 100 wt % | |
| Polishing Rate ($\mu$m/min) | | 3.45 | 3.44 | 3.37 | 3.45 | 3.30 |
| Occurrence of Scratch (pieces) | | 1 | 1 | 1 | 3 | 2 |
| Flatness: TV13 ($\mu$m) | | 0.2 | 0.4 | 0.3 | 0.4 | 0.4 |
| Surface Roughness: Ra ($\mu$m) | | 0.1844 | 0.2075 | 0.1635 | 0.2250 | 0.2248 |

As shown in Table 1, the polishing rates for the polishing agents of the present invention according to the Examples 1–3 were all higher compared to that of the polishing agents according to the Comparative Example 2 having been used conventionally. The polishing agents of the Examples 1 and 2 showed almost same polishing rates as that of the polishing agent of the Comparative Example 1 of 100% alumina powder and it could be verified that the wafers were lapped at an excellent polishing rate without mostly losing the polishing ability of alumina.

The occurrence of scratches in the lapped wafers lapped with the polishing agents of the Examples 1–3 was all one (1) piece and it could be seen that the occurrence of scratches caused during the lapping was sufficiently suppressed.

Furthermore, the flatness of the lapped wafers in the Examples 1–3 showed the same or smaller values compared to the wafers in Comparative Examples 1 and 2, and the flatness of wafers was further improved by the polishing agent of the invention. The surface roughness of the lapped wafers of the Examples 1–3 were also all smaller compared to that of lapped wafers of the Comparative Examples 1 and 2, and it was verified that the surface roughness of the lapped wafers was also surely improved by the polishing agent of the invention.

The present invention is not limited to the embodiments described above. The above-described embodiments are mere examples, and those having the substantially same structure as that described in the appended claims and providing the similar functions and advantages are included in the scope of the present invention.

For example, the above description has been made of cases where silicon wafers and quartz wafers are polished with the polishing agent of the present invention. However, the workpieces to be polished are not limited to those wafers, but it is needless to say that the polishing agent of the present invention is available for polishing compound semiconductors, oxide single crystals or other precision substrates.

While illustrative and presently preferred embodiments of the present invention have been described in detail herein, it is to be understood that the inventive concepts may be otherwise variously embodied and employed and that the appended claims are except insofar as limited by the prior art.

What is claimed is:

1. A lapping agent used for lapping a silicon wafer, containing at least silica powder that is produced by melting raw material silica powder in a flame and is substantially spherical or perfectly spherical and alumina powder, wherein the average grain diameter of the silica powder is 2–7 $\mu$m.

2. The lapping agent according to claim 1, wherein the average grain diameter of the silica powder is smaller than the average grain diameter of the alumina powder.

3. The lapping agent according to claim 1, wherein the amount of the silica contained in the polishing agent is 20–50 percent by weight.

4. The lapping agent according to claim 2, wherein the amount of the silica contained in the polishing agent is 20–50 percent by weight.

5. A lapping method comprising introducing a lapping agent to a silicon wafer, wherein the lapping agent contains at least silica powder that is produced by melting raw material silica powder in a flame and is substantially spherical or perfectly spherical and alumina powder, wherein the average grain diameter of the silica powder is 2–7 $\mu$m, and lapping the silicon wafer in the presence of the lapping agent.

6. The lapping method according to claim 5, wherein the average grain diameter of the silica powder is smaller than the average grain diameter of the alumina powder.

7. The lapping method according to claim 5, wherein the amount of the silica contained in the lapping agent is 20–50 percent by weight.

8. The lapping method according to claim 6, wherein the amount of the silica contained in the lapping agent is 20–50 percent by weight.

9. A lapping method in which a silicon wafer is being held between an upper turn table and a lower turn table, the silicon wafer lapped by rotating the upper and the lower turn tables while being supplied with a lapping agent, wherein the lapping agent is a lapping agent containing at least silica powder that is produced by melting raw material silica powder in a flame and is substantially spherical or perfectly spherical and alumina powder, and wherein the average grain diameter of the silica powder is 2–7 $\mu$m.

\* \* \* \* \*